United States Patent Office 3,390,713
Patented July 2, 1968

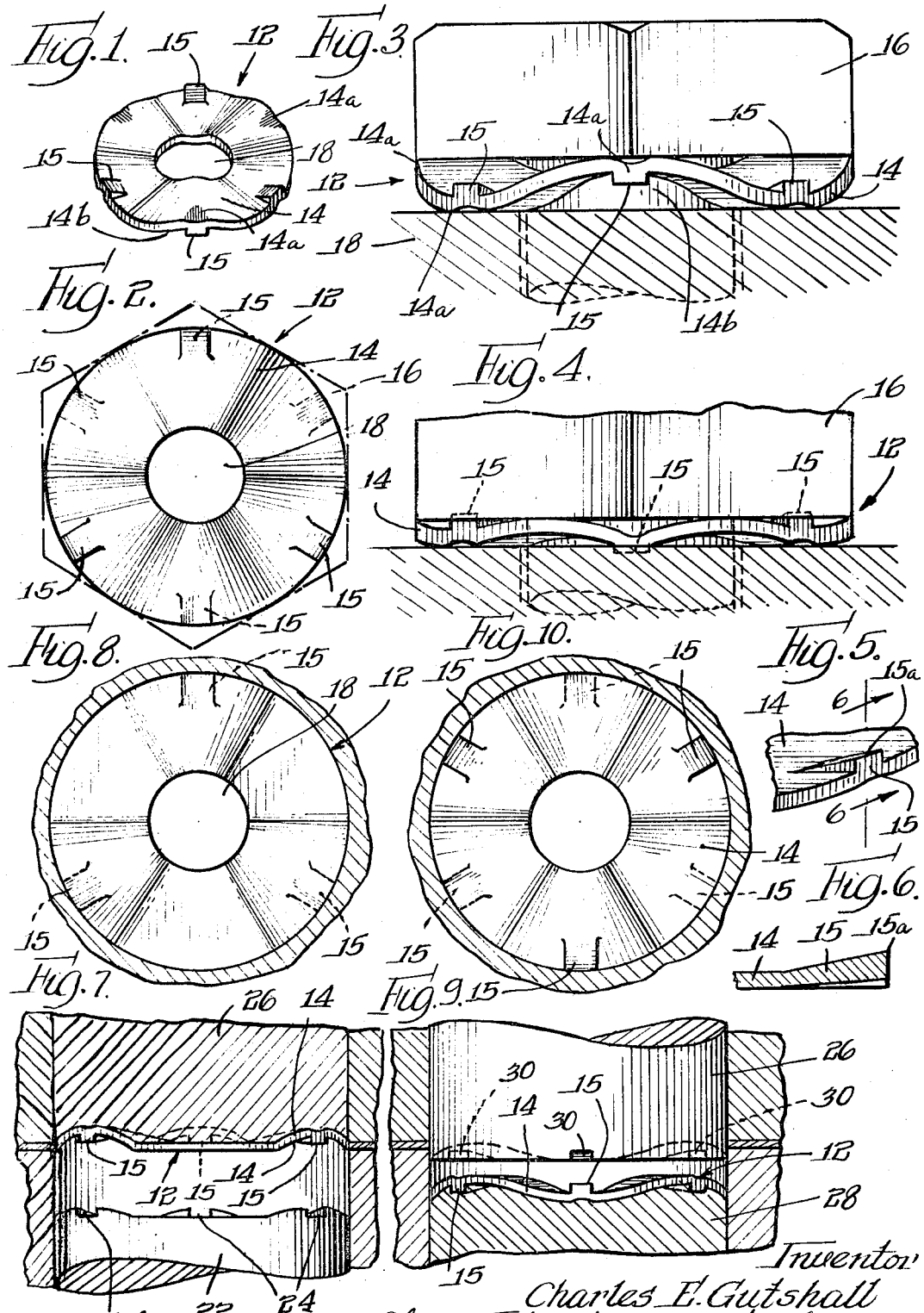

3,390,713
UNDULATED LOCKWASHER WITH LOCKING ABUTMENTS AT THE VALLEY SIDE OF EACH PEAK
Charles E. Gutshall, Roselle, Ill., assignor to Illinois Tool Works Inc., Chicago, Ill., a corporation of Delaware
Filed Dec. 16, 1965, Ser. No. 514,313
1 Claim. (Cl. 151—35)

ABSTRACT OF THE DISCLOSURE

Lockwashers and more particularly the type of washers incorporating an annular undulated body and a novel arrangement of work-impinging or locking abutments associated with said body. The embodiment of the invention described herein contemplates the use of rigid, work-impinging and locking abutments formed integral with and projecting axially from the valley side of each body undulation adjacent the outer margin thereof.

---

This invention relates generally to lockwashers and more particularly to lockwashers of the undulated type.

Washers of the type incorporating an undulated body have been well known heretofore. One of the main purposes of employing a wavy or undulated annular body in washers of the type contemplated hereby is to make available the axial resiliency of the washer body to resist loosening of a nut or screw head tightened thereagainst. In order to increase the locking effectiveness of such washers, it is important to provide means for preventing the complete flattening or collapsing of the undulated washer body when finally clamped in position, and also to insure aggressive impingement of the washer stock against the work surfaces between which the washer is clamped.

It is an object of the present invention to provide an improved washer of the type referred to above, wherein the locking efficiency is greatly enhanced over the undulated type of washers now available by providing a solid locking abutment with a chisel-like edge associated with the valley side of each washer peak at the outer periphery thereof preventing complete collapse of the undulated washer body when clamped between cooperating clamping members and at the same time taking advantage of the tendency of the washer body to expand radially under clamping pressure causing the chisel-like edge of each locking abutment to impinge the opposed clamping surfaces in the particular installation.

The foregoing, and other objects and advantages will be more apparent from the following detailed description wherein:

FIG. 1 is a perspective view of a lockwasher constructed in accordance with the teachings of the present invention;

FIG. 2 is a plan view of the washer shown in FIG. 1, a clamping nut associated therewith being indicated by dot-and-dash lines;

FIG. 3 is a side elevational view of the washer of FIGS. 1 and 2, shown beneath the clamping surface of a nut prior to tightening the nut against the washer;

FIG. 4 is a view similar to FIG. 3 showing the washer and nut in final clamped position;

FIG. 5 is an enlarged, fragmentary perspective view illustrating the structural features of the locking abutments associated with the washer body;

FIG. 6 is a fragmentary vertical sectional view taken along the line 6—6 of FIG. 5;

FIG. 7 is a central vertical sectional view of die members used in practicing the method of undulating the washer body and forming locking abutments on the underside thereof;

FIG. 8 is a plan view of the structure shown in FIG. 7 with the upper die member removed, so as to show more clearly the washer member;

FIG. 9 is a vertical central sectional view similar to FIG. 7, showing the die members used in a following step of the method for completing the undulations and for producing locking abutments along the upper surface of the washer member; and FIG. 10 is a plan view of a device as shown in FIG. 9 with the upper die member removed.

Referring now to the drawing more in detail, wherein like numerals have been employed to designate similar parts throughout the various figures, it will be seen that one embodiment of the lockwasher contemplated by the present invention is designated generally by the numeral 12. The washer 12 has an undulated or wavy body 14. In the particular embodiment disclosed herein the undulated body 14 presents three peaks on one side and three peaks on the opposite side, each peak portion being designated by the numeral 14a and each valley area beneath the peaks 14a being indicated by the numeral 14b (see FIGS. 1 and 3).

In association with the underside of the crest of each peak 14a and extending into the complementary valley 14b is a locking abutment 15. Particular attention is directed to the fact that each of these locking abutments is not only formed integral with the body 14, but also rigid with said body. As the peak 14a with which the rigid abutment 15 is associated axially flexes as an incident to clamping the washer between a nut 16 on one side and the surface of a workpiece 18 on the opposite side, the peak and its associated locking abutment will move as a unit. It will also be noted that the locking abutments 15 project into the valley area 14b a distance which is less than the maximum depth of the valley, thereby assuring considerable axial flexing of the body undulations before the abutments are brought into locking impingement with the above-mentioned oppositely disposed work surfaces. These rigid locking abutments may be formed as for example, by extrusion or coining methods, later to be described.

The locking abutments 15, as clearly shown in FIGS. 5 and 6 have their greatest axial thickness adjacent the outer margin of the washer body and diminish in thickness as they extend radially inward to a point where they merge or blend with the surface of the washer body. As the undulated washer body is tightened between the work clamping surfaces from the position shown in FIG. 3 to the position shown in FIG. 4, the abutments 15 shift into locking impingement with these work surfaces and the undulations are axially stressed. During this process of flattening or collapsing the washer body undulations, the washer material also experiences a small but perceptible radial expansion. As a result of this radial expansion the aggressive chisel-like edges designated by the numeral 15a in FIGS. 5 and 6 actually become imbedded within the clamping surfaces. This increase in aggressive impingement of the edges 15a of the abutments 15 with the work clamping surfaces serves to enhance greatly the locking efficiency of the washer.

In FIGS. 7–10, inclusive, die means are shown whereby the methods contemplated by the present invention may be practiced. It is contemplated that the first step in the production of sheet metal lockwashers of the heretofore described type, would be to punch the central aperture 18 from a strip of sheet metal stock. Either simultaneously with the forming of this aperture 18, or by employing punching and forming dies 20 and 22 shown in FIG. 7, the central washer may be stamped from the sheet metal body. At the station illustrated in FIG. 7, the undulated surfaces of the dies 20 and 22 cooperate to form a series of three equally spaced waves extending upwardly from the main body of the washer as illustrated in FIG. 7. The die member 22 is provided with forming areas or recesses 24 which function to coin or extrude the material on the underside of the washer stock so as to provide a series of equally spaced abutments or protuberances 15 of the type previously described. Both the upper surface of the die member 22 and the lower surface of the die member 20 are provided with arcuate surfaces which cooperate to produce the undulations at three equally spaced positions. From the station illustrated in FIG. 7, the washer is moved to the die station shown in FIG. 9, wherein die members 26 and 28 function to complete the undulation of the washer body and the forming of locking abutments 18 on the upper surface of the body as clearly illustrated in FIGS. 9 and 10. The die members 26 and 28, like the previously mentioned die members 20 and 22, are provided with coacting unrulated surfaces which serve to form three equally spaced waves extending downwardly from the median plane of the washer body. Recesses or extruding areas 30 on the die member 26 function to form the locking abutments 15 along the upper side of the washer as viewed in FIG. 9. The washer has now been completely formed and is thereafter subjected to the desired heat treatment.

From the foregoing, it will be apparent that the present invention contemplates an improved undulated type washer as well as improved methods and means for producing such washers. By having the locking abutments formed rigid and integral with the undulated body and projecting axially from the underside of the crest of each peak as above described, the locking efficiency of the washer is enhanced materially. Thus the invention contemplates an undulated type washer which not only affords the desired degree of axial resiliency, but which also will not completely flatten, and the novel abutments will effectively impinge the work surfaces between which the washer is clamped.

Also, the die stations are so arranged that a given number of partial undulations, as well as the abovementioned locking abutments, are formed at one station and the remaining equal partial undulations and oppositely disposed locking abutments are formed at a second station so as to complete the forming of the washer prior to heat treatment thereof. Applicant's novel method adapted to be practiced by the use of these dies increases the efficiency of production.

As previously pointed out, a washer constructed in accordance with the teachings of the present invention makes it possible to utilize for practical locking purposes the small but perceptible radial expansion of the washer body which results from clamping the undulated body between work surfaces. While for purposes of illustration a specific embodiment of the washer contemplated by the present invention has been shown, it should be understood that the invention contemplates modifications and changes coming within the scope of the appended claim.

The invention is claimed as follows:

1. A sheet metal lockwasher including an annular body of imperforate undulated form presenting in circumferential section a series of axially yieldable peaks, the crests and undersurfaces of which normally and alternately project axially from opposite sides of the median plane of the washer body and define unbroken radial lines completely traversing said body, the undersurface of each peak defining a complementary valley, and a solid locking abutment having a circumferentially extending chisel-like edge associated with the underside of each washer peak at the outer periphery thereof and presenting a washer thickness in the vicinity of said chisel-like edge which is greater than the normal thickness of the undulated washer body, the remaining portion of each abutment progressively diminishing in height in a radial direction to merge with the surface of said washer body, said locking abutments extending for a radial distance less than one-half the radial width of the washer body, said locking abutments formed rigid and integral with said body along the outer margin and projecting axially from the underside of the crest of each peak into the complementary valley thereof a distance less than the maximum depth of said valley, whereby to permit a desired degree of initial yield and consequent stress of said undulated body before said abutments lockingly impinge oppositely disposed work surfaces and prevent complete collapse of the undulated body form as the washer is clamped therebetween, the crests of said body and locking abutments associated therewith being distributed on opposite sides of the washer so as to permit either side of the washer to be applied to a complementary work surface.

References Cited

UNITED STATES PATENTS

| 2,069,402 | 2/1937 | Cowlin | 151—35 |
| 2,274,010 | 2/1942 | Stellin | 151—38 |
| 2,817,380 | 12/1957 | Knohl | 151—38 |
| 3,194,292 | 7/1965 | Borowsky | 151—35 |

FOREIGN PATENTS

| 790,781 | 2/1958 | Great Britain. |

CARL W. TOMLIN, *Primary Examiner.*

R. S. BRITTS, *Assistant Examiner.*